United States Patent
Wathen

(10) Patent No.: US 6,729,805 B2
(45) Date of Patent: *May 4, 2004

(54) METHODS AND COMPOSITIONS FOR REDUCING DUST AND EROSION OF EARTH SURFACES

(76) Inventor: Boyd J. Wathen, 7045 W. 9600 North, Lehi, UT (US) 84043

( * ) Notice: Subject to any disclaimer, the term of this patent is extended or adjusted under 35 U.S.C. 154(b) by 0 days.

This patent is subject to a terminal disclaimer.

(21) Appl. No.: 10/234,420

(22) Filed: Sep. 3, 2002

(65) Prior Publication Data

US 2003/0029356 A1 Feb. 13, 2003

Related U.S. Application Data

(63) Continuation-in-part of application No. 09/693,671, filed on Oct. 20, 2000, now Pat. No. 6,443,661.

(51) Int. Cl.$^7$ ........................... C09K 17/00; E01C 21/00
(52) U.S. Cl. ................. 405/263; 405/258.1; 405/302.6; 404/76; 252/88.1; 106/244; 106/900
(58) Field of Search ................................. 106/244, 900; 252/88.1; 405/258.1, 263, 264, 302.4, 302.6; 404/76

(56) References Cited

U.S. PATENT DOCUMENTS

| | | | |
|---|---|---|---|
| 3,005,790 A | | 10/1961 | Wynn et al. |
| 4,001,033 A | * | 1/1977 | Anthone et al. ............. 106/900 |
| 4,107,112 A | * | 8/1978 | Latta, Jr. et al. ............. 405/264 |
| 4,571,116 A | * | 2/1986 | Patil et al. ..................... 404/76 |
| 4,663,067 A | * | 5/1987 | Mallow et al. ............. 106/900 |
| 4,735,658 A | * | 4/1988 | Blet et al. .................... 106/900 |
| 4,827,871 A | | 5/1989 | Morrison |
| 5,192,337 A | | 3/1993 | Wajer et al. |
| 5,235,070 A | | 8/1993 | Green et al. |
| 5,595,782 A | * | 1/1997 | Cole ........................ 252/88.1 |
| 5,603,745 A | * | 2/1997 | Pettersen et al. .............. 71/58 |
| 5,667,718 A | * | 9/1997 | Jones et al. .................... 106/36 |
| 5,801,204 A | * | 9/1998 | Johansson et al. ............. 521/41 |
| 5,968,222 A | * | 10/1999 | Kodali ....................... 71/64.07 |
| 6,065,903 A | * | 5/2000 | Doyle ........................ 405/264 |
| 6,149,351 A | * | 11/2000 | Doyle .................. 405/128.75 |
| 6,443,661 B1 | * | 9/2002 | Wathen ....................... 405/262 |

OTHER PUBLICATIONS

"Oil and pigs do mix. Odors can be reduced using a natural substance" Jacobson, L.D.; *Resource: Engineering & Technology for a Sustainable World*, vol. 7, No. 3, 2000, pp. 7–8.
"Dust control in pig houses by spraying rapeseed oil."; Takai, H. et al.; *Transactions of the ASAE*; vol 38, No. 5 1995, pp. 1513–1518.
"Dust suppression during grain movement: field evaluation of oil/water emulsions, Malu, Queensland, Mar. 1993." Annis, P.C. et al.; a report from the Division of Entomology, CSIR, report No. 59, 1994, 10 pages, Australia.

* cited by examiner

*Primary Examiner*—Frederick L. Lagman
(74) *Attorney, Agent, or Firm*—Mallinckrodt & Mallinckrodt; Robert R. Mallinckrodt

(57) ABSTRACT

Dust from and erosion of earth surfaces is controlled by the application of a fatty acid containing material such as used vegetable oil, animal renderings, or a combination thereof such as Yellow Grease to the surface and allowing the surface to harden and dry. The hardening and drying of the surface may be accelerated by making an at least semi-emulsion of the fatty acid containing material with a surface binding material such as lignin, magnesium chloride, calcium chloride, or a mixture thereof, and water. With the at least semi-emulsion, the fatty acid containing material makes up between about 30% to about 75% of the product, the surface binding material makes up between about 10% and about 40%, with the water making up the remainder. The product is applied to the earth surface to be treated and dries in several hours. The fatty acid containing material or semi-emulsion product appears to be absorbed by the top layer of earth forming the surface and binds the earth particle together to form a relatively hard and water repellant surface which resists the generation of dust and reduces erosion and wear of the surface.

20 Claims, No Drawings

METHODS AND COMPOSITIONS FOR REDUCING DUST AND EROSION OF EARTH SURFACES

RELATED APPLICATION

This is a continuation-in-part of my application Ser. No. 09/693,671, filed Oct. 20, 2000, now U.S. Pat. No. 6,443,661.

BACKGROUND OF THE INVENTION

1. Field

The invention is in the fields of methods and compositions for treating earth surfaces, such as dirt and gravel roads and parking lots, to reduce dust from and erosion of such surfaces.

2. State of the Art

Dust control on exposed earth surfaces is a continuing problem. Surfaces such as dirt roads and dirt parking lots generate substantial dust when driven over by a vehicle and can generate dust in windy weather conditions. Erosion from vehicle use and from weather conditions, such as rain, snow, or wind, also are problems for such surfaces. Surfaces such as construction sites and tailing disposal sites have similar problems, particularly in windy conditions.

There are various prior art ways of dealing with the dust problems. One way is to spray water onto the problem earth surfaces to eliminate dust. However, this is very wasteful of the water used and is labor intensive as the surface has to be maintained in a damp condition and damp surfaces dry quickly in many areas.

In some instances, petroleum products, such as diesel fuel, have been used to spread on earth surfaces to reduce dust and erosion. However, such products have been found to cause contamination of water supplies so is now outlawed in most areas. Chemicals such as magnesium chloride, re-claimed asphaltic materials, resins, lignins, lignin sulfonates, lecithin and its derivatives, and various other materials have and are being used in various circumstances, but have associated problems of contamination, only short term effectiveness because it is washed away with rain or is worn away through use, questionable effectiveness, or expense.

Vegetable oil has been tried but has similar problems to other prior art materials in that it is easily washed away by water so is effective after application only until the next rain.

SUMMARY OF THE INVENTION

According to the invention, it has been found that a fatty acid containing grease or oil, referred to herein as a fatty acid containing material, such as rendered grease and/or used vegetable oil, creates a long lasting and cost effective material to apply to earth surfaces to reduce dust from and erosion of such surfaces. While vegetable oil is only temporarily effective for dust control because it is easily washed away by water so is easily washed away by rain, used vegetable oil and rendered animal grease, or mixtures thereof, which contain fatty acids and surprisingly do not wash away with water, are very effective for not only long lasting dust control, but erosion control also. It has been found that such product appears to bind to and penetrate into the top layer of earth forming the surface and binds the particles forming the surface and top layer together to form a dust resistant and water repellent, relatively hard surface that appears to last indefinitely.

While I previously believed that the fatty acid containing material needed to be mixed with water, with at least one of the ingredients, preferably the fatty acid containing material, at an elevated temperature, so that upon mixing, an emulsion or semi-emulsion product is formed, see my copending application, now U.S. Pat. No. 6,443,661, incorporated herein by reference, I have now found that such mixing with water is unnecessary and that applying the fatty acid containing material directly to the surface works well. The mixing with water to form an emulsion or semi-emulsion is not necessary. Further, with such emulsions or semi-emulsions, or with the straight fatty acid containing material, it is not necessary to have the fatty acid containing material at an elevated temperature depending upon the temperature of the surface to which it is applied and the temperature of the surrounding air. However, an emulsion or semi-emulsion can still be used and is very effective. In addition, I have found that if an emulsion is used, the drying time necessary to form a relatively hard and water resistant surface can be reduced by including a binding material such as lignin, magnesium chloride, and/or calcium chloride in the emulsion or semi-emulsion. Lignins, magnesium chlorides, and calcium chlorides are currently used on roads and other surfaces for dust control, but remain water soluble when applied to the road or other surface so wash off with water, such as with rain or snow fall. The useful life of a road coating of such material in a usually dry climate is generally no more than three to six months, and less in a wet climate. With the fatty acid containing material, the lignin, magnesium chloride, or calcium chloride is coated with the fatty acid material which has been found to make it water resistant giving it much longer life.

The fatty acid containing material may come from various sources. Used vegetable oil may come from sources such as fast food outlets where it has been used for cooking food such as french fries or from industries such as potato chip or other snack food factories. The rendered grease will generally come from an animal rendering plant, and may be tallow or similar products. The presently preferred fatty acid containing material is a mixture of used vegetable oil and animal fat available from animal rendering plants and referred to as Yellow Grease. Most animal rendering plants collect used vegetable oil, mix it with animal fat to create the Yellow Grease which is used on or as animal feed.

The described fatty acid containing material generally has an unpleasant odor. Therefore, when using the fatty acid containing material, it is generally preferred to deodorize the material. A masking scent may be added to the material before it is applied to the surface. It has been found, however, that when lignin is used in the emulsion or semi-emulsion, a masking scent is not necessary as the lignin masks the odor.

Where the fatty acid containing material alone is applied to the surface, the material should be at least about 85° F. when applied with a surface temperature of at least about 90° F. and an air temperature of at least about 60° F. and preferably above about 80° F. If surface temperatures are below those given, it is preferable to heat the fatty acid containing material to a higher temperature before application. The same holds true for an emulsion or semi-emulsion.

With an emulsion or semi-emulsion, as indicated in my prior patent cited above, the product needs to remain in the emulsion or semi-emulsion state only until the product is applied to the surface to be treated. The mixing of the product can take place in advance of application and kept in a tank or drum, or can take place in a tank such as the tank of a truck which applies the material with a spray bar, or may be mixed as the ingredients are pumped together from separate tanks for application through a spray bar or nozzle.

If desired, an emulsifying agent may be added. Such agent is generally mixed with the water prior to mixing with the fatty acid containing material. Use of the emulsifying agent appears to allow a lower fatty acid containing material to water ratio and more uniform spreading of the product on an earth surface.

When using an emulsion or semi-emulsion with lignin, magnesium chloride, and/or calcium chloride, the lignin, usually in the form of lignol sulfonate, magnesium chloride, and/or calcium chloride, will make up about 10% to about 40% of the emulsion or semi-emulsion, the fatty acid containing material will make up between about 30% and about 75%, preferably about 50%, and water will make up the remaining amount, usually between about 10% and about 50%, preferably between about 20% to about 30%. If an emulsifying agent is used, such agent may make up to about 1% of the emulsion or semi-emulsion. The fatty acid containing material may be heated prior to mixing with the other ingredients, but while it was previously thought that heating to a temperature between about 130° F. to about 215° F. was preferred, it has been found that the fatty acid containing material will mix satisfactorily at about 85° F. The water, and if liquid, the lignin, the magnesium chloride, or the calcium chloride, may also be heated, but may be used at ambient temperature.

The straight fatty acid containing material or the emulsion or semi-emulsion may be sprayed onto the surface or poured onto the surface and is absorbed into the surface where it has been found to bind surface particles to form a relatively hard surface thereby reducing dust and erosion of the surface.

DETAILED DESCRIPTION OF THE ILLUSTRATED EMBODIMENT

The invention is a product to be applied to an earth surface to reduce the dust from the earth surface and to reduce the erosion of the earth surface. The invention also includes the method of reducing the dust from and the erosion of an earth surface by applying the product of the invention to the earth surface or by merely applying a fatty acid containing material to the earth surface.

The product of the invention, in addition to a combination, in an emulsion or semi-emulsion form, of a fatty acid containing material and water as described in U.S. Pat. No. 6,443,661, is a combination, in an emulsion or semi-emulsion form, of a fatty acid containing material, a lignin, magnesium chloride, and/or calcium chloride, and water. An emulsifying agent can be added, if desired. The fatty acid containing material is a grease or oil which contains fatty acid. The grease or oil is nonpetroleum based and generally will be an animal grease or used vegetable oil. The grease generally will be a rendered animal product from an animal rending plant such as tallow, or similar product. The oil will generally be used vegetable oil or similar product. Such used oil can be obtained from fast food outlets, restaurants, or some food manufacturing plants. Generally, animal rendering plants will collect used vegetable oil and mix it with animal grease to form a mixture of both vegetable oil and animal grease, generally referred to as Yellow Grease. While Yellow Grease can have various compositions, it has been found that all Yellow Greases and similar products experimented with by the inventor are satisfactory.

The fatty acid containing material as described above usually has an unpleasant odor. It is generally preferred that it be deodorized before use. Deodorizing can be achieved by the addition of a fragrance to the fatty acid containing material. Vegetable mask fragrance or neutrox fragrance sold by Orchidia Company of Downers Grove, Ill., has been found satisfactory. The addition of between about 0.13% and about 0.175% of such fragrance has been found sufficient to substantially eliminate the odor. While the amount of masking scent used is not critical, to little scent leaves the unpleasant odor while to much scent produces another sometimes unpleasant scent. The range given has been found to effectively mask the unpleasant scent without creating another scent.

In the emulsion or semi-emulsion product, the fatty acid containing material will make up between about 30% to about 75% of the product, preferably about 50%, the lignin, magnesium chloride, and/or calcium chloride will make up about 10% to about 40% of the of the product, preferably about 20%, with water making up the remaining amount, usually between about 10% and 50%, preferably about 30%. The fatty acid containing material should be at least 85° F. when mixed and may be heated to between about 85° F. and about 250° F. prior to mixing and application to the surface concerned. The water used may be at ambient temperature or may also be heated, as may the lignin, magnesium chloride, or calcium chloride, if a liquid when mixed. If a powder, the lignin, magnesium chloride, or calcium chloride may be dissolved in the water before mixing with the fatty acid containing material. Alternately, all ingredients may be mixed together and then heated, if necessary because of conditions, before mixing into the semi-emulsion and application to the surface.

The lignin will usually be a lignol sulfonate and may be in powder form or in the form of an aqueous solution. The aqueous solution will usually be 50% lignol sulfonate and 50% water. When mixing, enough of the aqueous solution is used to provide the desired amount of lignol sulfonate in the finished mixed product. For example, if 20% lignin is desired in the mixed product, the 50% lignol sulfonate solution will be mixed to make up 40% of the product, thereby providing 20% lignon sulfonate and 20% of the water.

The mixing of the product may be achieved in various ways. The fatty acid containing material and water with the lignin, magnesium chloride, or calcium chloride therein may be pumped through a static in-line mixer, such as blades arranged in a pipe through which the fatty acid containing material and water flow with the blades causing turbulence and mixing of the fatty acid containing material and water. While an in-line mixer will work, the mixed life of the product is best maintained by using an emulsion pump for mixing the product. Such pump may take the form of a centrifugal pump through which the fatty acid containing material and water with the lignin, magnesium chloride, or calcium chloride therein is pumped. Generally, the fatty acid containing material will be pumped from a tank or other storage vessel into a mixing pipe and the water with the lignin, magnesium chloride, or calcium chloride therein will be pumped from another tank or storage vessel into a mixing pipe and the materials will be mixed and discharged into a storage tank such as on a tank truck. The product can be pumped from the tank to a discharge such as a spreader spray bar or nozzle.

Where the product is to be stored in a storage vessel, such as a tank on a truck having a spray bar for spreading the product, rather than being spread immediately upon mixing, the product can be placed in the vessel and may be mixed by a pump which recirculates the product in the vessel. Some time for mixing due to the recirculation is required before the product is used to ensure that it has reached the form of the emulsion or semi-emulsion. Alternately, or in addition to recirculation, air can be introduced into the holding vessel to bubble through the product and cause mixing to form the emulsion or semi-emulsion. Where the straight fatty acid containing material is spread, it is merely loaded into the tank and spread. No recirculation or other mixing is necessary.

If desired, an emulsifying agent can be used in the product. It is preferred that any emulsifying agent used be added to the water and be allowed to hydrate. A water soluble anionic polymer sold under the designation D-L by 3V Company of New Jersey has been found satisfactory. Usually the hydration of the emulsifying agent will take from 2 to 15 hours. The time involved will depend upon the temperature of the water, the higher the temperature the shorter the time, and on whether any mixing of the water and emulsifying agent takes place. Various mechanical mixing devices can be used such as stirrers, pumps, or air circulation. When hydrated, the water and emulsifying agent will have a viscosity similar to thick gravy. This water mixture is then mixed with the other ingredients. Use of the emulsifying agent aids in the formation of an emulsion of the ingredients to form a relatively stable or long lasting emulsion. However it is not necessary.

While with the emulsion or semi-emulsion of just the fatty acid containing material and water of my cited patent, vehicle travel on a road or other surface to which the product had been applied is usually halted for at least two to four hours while the product is absorbed into the surface and dried, with the emulsion or semi-emulsion including the lignin, magnesium chloride, and/or calcium chloride, vehicle travel need only be stopped for about one to two hours for absorption and drying. It has been found that the bonding together of the particles making up the top layer and surface of the earth to which the product is applied and drying of the product to form the relatively hard surface takes place in that shorter time, usually about half the time. Further, while lignins, magnesium chloride and/or calcium chloride used alone for dust control as in the prior art remain water soluble and will wash out of the road surface with water applied thereto, such as with a rain or snow storm, so that dust is again a problem, it has been found that with the fatty acid containing material mixed with the lignin, magnesium chloride, and/or calcium chloride, the surface becomes water resistant and the surface formed remains relatively hard and dust free even with the application of water to the surface. Further, the surface appears to have more body when the lignin, magnesium chloride, or calcium chloride is included in the emulsion or semi-emulsion than when the emulsion or semi-emulsion is just the fatty acid containing material and water.

EXAMPLE 1

Approximately 32 square feet of earth surface were treated with a product of the invention consisting of five pounds of used vegetable oil, two pounds of lignin in the form of lignol sulfonate, and three pounds of water. On a weight basis this was 50% used vegetable oil, 20% lignin, and 30% water. The mixture was heated to 130° F. and then blended into a semi-emulsion. The semi-emulsion was spread on the earth surface by a hand held sprinkling container. The product was applied at the rate of 1.25 gallons (the entire amount made) for 32 square feet of surface. The surface was then observed and appeared to harden within one to two hours of application and not only controlled dust, but also became water resistant.

EXAMPLE 2

Approximately 625 square feet of dirt road was sprayed with product of the invention using a water pump, hose, and sprayer. The product for this example consisted of 100 pounds of used vegetable oil, 40 pounds of lignin in the form of lignol sulfonate, and 60 pounds of water. This gave a weight based formula of 50% used vegetable oil, 20% lignin, and 30% water. The ingredients were mixed and heated to 130° F. The mixture was the mixed to a semi-emulsion using an emulsion blade on a steel one-half inch shaft with a variable speed drill. The product was sprayed on the road with the sprayer. The surface was observed and after about one to two hours, the product appeared to bond to the surface and the surface hardened and became water resistant. Dust was also eliminated.

EXAMPLE 3

Approximately 625 square feet of dirt road was sprayed with product of the invention using a water pump, hose, and sprayer. The product for this example consisted of 100 pounds of used vegetable oil, 40 pounds of magnesium chloride, and 60 pounds of water. This gave a weight based formula of 50% used vegetable oil, 20% magnesium chloride, and 30% water. The ingredients were mixed and heated to 100° F. The mixture was then mixed to a semi-emulsion using an emulsion blade on a steel one-half inch shaft with a variable speed drill. The product was sprayed on the road with the sprayer. The surface was observed and after about one to two hours, the product appeared to bond to the surface and the surface hardened and became water resistant. Dust was also eliminated.

It has been found that a good hardened, water resistant surface can be formed by applying fatty acid containing material alone to the surface. In such case, the fatty acid containing material should be at least about 85° F. when applied to the surface with a surface temperature of at least about 90° F. and an air temperature of at least about 60° F. and preferably above about 80° F. If surface temperatures are below those given, it is preferable to heat the fatty acid containing material to a higher temperature before application. The fatty acid containing material can be heated up to about 250° F. The warmer the fatty acid containing material or the surface to which it is applied, the faster it will be absorbed by the surface material and dry. The surface formed is similar to that formed by spraying the fatty acid containing material-water emulsion or semi-emulsion onto the surface.

EXAMPLE 4

Approximately 126,720 square feet of dirt road was sprayed with straight used vegetable oil. The road was one mile long (5280 feet) by 24 feet wide. The used vegetable oil was heated to 175° F. and approximately 4,000 gallons was loaded into one compartment of a tank sprayer truck. Approximately 2,000 gallons of water heated to 175° F. was loaded into a second compartment of the truck. The road was then sprayed with the straight vegetable oil applied at a rate of about 30 square feet per gallon. For experimental purposes, after the oil had been on the road surface for about one hour, water was sprayed on one half the road, but not on the other half of the road. Because of the atmospheric conditions, i.e., the air temperature was only 54° F., drying time was about 5 hours. After the 5 hour drying time, the surface had hardened and become water resistant to about the same extent as it had in the examples of the cited patent using the semi-emulsion of fatty acid containing material and water. Both halves of the road, the one with only used vegetable oil applied and the one with water applied after application of the used vegetable oil, appeared to have hardened to about the same degree and both showed about the same amount of water resistance. The road surface has remained hard and water resistant for about a year with moderate car and truck traffic. Application was in September so the surface has been through one winter and one summer of weather and use.

The amount of fatty acid containing material applied to the surface, i.e., the rate of application, is not critical, but does affect the time needed for the material to be absorbed into the surface and to dry. Where the product is heavily applied, it can take several days to be absorbed and dry. In such instances, the surface formed is hard and like an asphalt surface. The more heavily applied, the harder and more durable the surface appears to be, but the longer it takes to be absorbed and dry. However, it has been found that an application rate of between about 25 to about 45 square feet per gallon, and preferably about 25 to about 35 square feet per gallon creates a satisfactory surface that usually dries in about two to four hours for the straight fatty acid containing material and about one to two hours for the emulsion or semi-emulsion containing the lignin, magnesium chloride, or calcium chloride. This application rate creates a relatively hard and durable surface and is absorbed and dries to the extent that traffic can again travel over the surface in the indicated times. If applied at a rate of about ten to fifteen square feet per gallon, it takes up to several days to dry. It is much more disruptive to keep traffic off a road for these longer periods, and the surface formed does not appear better to the extent to justify the increased drying time and increased cost for the fatty acid containing material.

Because the fatty acid containing material and the other products of the invention create a relatively hard surface on the earth treated and that relatively hard surface resists wear, it is generally preferred that the surface, particularly if a dirt road, be graded or otherwise smoothed prior to the application of the product. Otherwise, the ruts and washboard areas in the road are preserved with the hard surface formed by the treatment.

Whereas this invention is here described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A method of controlling dust from and erosion of earth surfaces consisting essentially of the steps of applying a fatty acid containing material selected from the group consisting of rendered grease from animals, used vegetable oil, or a mixture thereof to the earth surface; and allowing the fatty acid containing material to be absorbed into the surface and dry to form a hardened surface.

2. A method of controlling dust from or erosion of earth surfaces according to claim 1, wherein the rendered grease from animals is selected from the group consisting of yellow grease or tallow.

3. A method of controlling dust from and erosion of earth surfaces according to claim 1, wherein the fatty acid containing material is applied at a temperature of at least 85° F.

4. A method of controlling dust from and erosion of earth surfaces according to claim 1, wherein the fatty acid containing material is applied at a rate of about 20–45 square feet per gallon.

5. A method of controlling dust from and erosion of earth surfaces according to claim 1, wherein the fatty acid containing material is applied at a rate of about 25–35 square feet per gallon.

6. A method of controlling dust from and erosion of earth surfaces comprising the steps of mixing a fatty acid containing material selected from the group consisting of rendered grease from animals, used vegetable oil, or a mixture thereof with a surface binding material selected from the group consisting of lignin, magnesium chloride, calcium chloride, or a mixture thereof, and water in a manner to produce at least a temporary semi-emulsion; applying the at least temporary semi-emulsion to the earth surface to be treated; and allowing the at least temporary semi-emulsion to be absorbed into the surface and dry to form a hardened surface.

7. A method of controlling dust from or erosion of earth surfaces according to claim 6, wherein the fatty acid containing material makes up between about 30% and about 75% of the at least semi-emulsion, the surface binding material makes up between about 10% and about 40% of the at least semi-emulsion, and water makes up between about 10% and about 50% of the at least semi-emulsion.

8. A method of controlling dust from or erosion of earth surfaces according to claim 7, wherein the fatty acid containing material makes up about 50% of the at least semi-emulsion, the surface binding material makes up about 20% of the at least semi-emulsion, and water makes up about 30% of the at least semi-emulsion.

9. A method of controlling dust from or erosion of earth surfaces according to claim 6, wherein the lignin is lignol sulfonate.

10. A method of controlling dust from and erosion of earth surfaces comprising the steps of mixing a fatty acid containing material selected from the group consisting of rendered grease from animals, used vegetable oil, or a mixture thereof, a surface binding material selected from the group consisting of lignin, magnesium chloride, calcium chloride, or a mixture thereof, and water in a manner to produce at least a temporary semi-emulsion, and applying the at least a temporary semi-emulsion to the earth surface to be absorbed into the surface.

11. A method of controlling dust from or erosion of earth surfaces according to claim 10, wherein the rendered grease from animals is selected from the group consisting of yellow grease or tallow.

12. A method of controlling dust from or erosion of earth surfaces according to claim 10, wherein the fatty acid containing material makes up between about 30% and about 75% of the at least semi-emulsion, the surface binding material makes up between about 10% and about 40% of the at least semi-emulsion, and water makes up between about 10% and about 50% of the at least semi-emulsion.

13. A method of controlling dust from or erosion of earth surfaces according to claim 12, wherein the fatty acid containing material makes up about 50% of the at least semi-emulsion, the surface binding material makes up about 20% of the at least semi-emulsion, and water makes up about 30% of the at least semi-emulsion.

14. A method of controlling dust from or erosion of earth surfaces according to claim 10, wherein the lignin is lignol sulfonate.

15. A method of controlling dust from or erosion of earth surfaces, consisting essentially of the steps of mixing in a manner to produce at least a temporary semi-emulsion, water and a fatty acid containing material wherein the at least temporary semi-emulsion is at a temperature of between about 85° F. and about 250° F.; and applying the at least a temporary semi-emulsion to the earth surface to be absorbed into the surface.

16. A liquid treatment product for earth surfaces to control dust from and erosion of the earth surface to which the product is applied, comprising of:
   a fatty acid containing material selected from the group consisting of rendered grease from animals, used vegetable oil, or a mixture thereof;
   a surface binding material selected from the group consisting of lignin, magnesium chloride, calcium chloride, or a mixture thereof; and
   water;
   wherein the product is in the form of at least a temporary semi-emulsion at the time of application to the earth surface.

17. A liquid treatment product for earth surfaces to control dust from or erosion of the earth surface to which the product is applied according to claim 16, wherein the rendered grease from animals is selected from the group consisting of yellow grease or tallow.

18. A liquid treatment product for earth surfaces to control dust from and erosion of the earth surface to which the product is applied according to claim 16, wherein the lignin is lignol sulfonate.

19. A liquid treatment product for earth surfaces to control dust from and erosion of the earth surface to which the product is applied according to claim 16, wherein the fatty acid containing material makes up between about 30% and about 75% of the at least semi-emulsion, the surface binding material makes up between about 10% and about 40% of the at least semi-emulsion, and water makes up between about 10% and about 50% of the at least semi-emulsion.

20. A liquid treatment product for earth surfaces to control dust from and erosion of the earth surface to which the product is applied according to claim 17, wherein the fatty acid containing material makes up about 50% of the at least semi-emulsion, the surface binding material makes up about 20% of the at least semi-emulsion, and water makes up about 30% of the at least semi-emulsion.

* * * * *